Aug. 29, 1967   E. A. GARDNER   3,338,472
ANTI-FLUSHING AUTOMATIC SCREW FEEDER
Filed Jan. 10, 1966
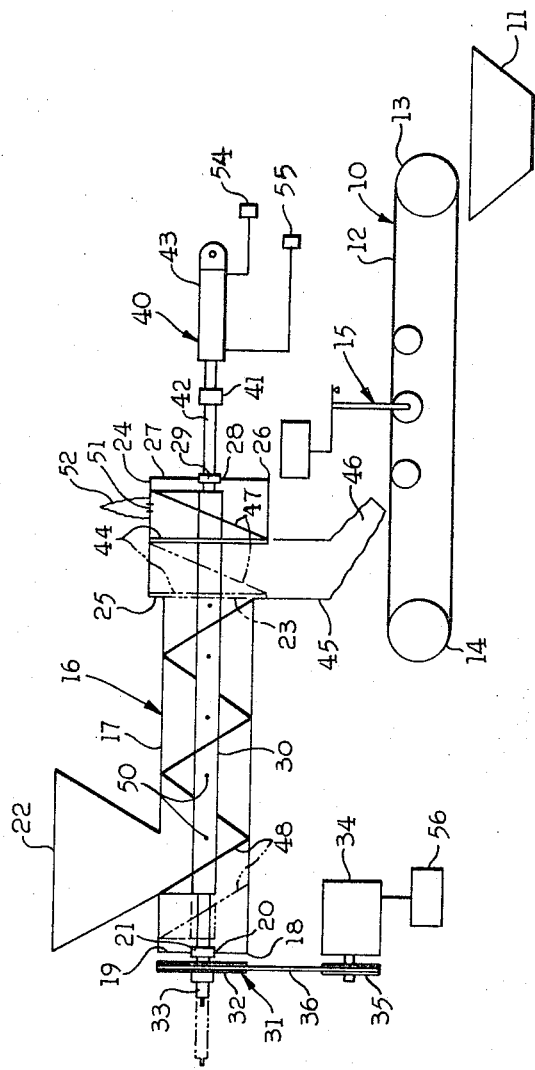
INVENTOR
ERNEST A. GARDNER
BY Kramer & Sturges
ATTORNEYS United States Patent Office 3,338,472
Patented Aug. 29, 1967

3,338,472
ANTI-FLUSHING AUTOMATIC SCREW FEEDER
Ernest A. Gardner, Chagrin Falls, Ohio, assignor to McDowell-Wellman Engineering Co., a corporation of Ohio
Filed Jan. 10, 1966, Ser. No. 519,550
13 Claims. (Cl. 222—55)

ABSTRACT OF THE DISCLOSURE

A screw-type feeder for moving flowable material such as cement, and for stabilizing the flow of such material from a discharge opening in the feeder. The feeder includes means responsive to material discharged from the opening for moving the rotating screw axially with respect to the opening to surge or retard the flow of material towards the opening. Also included is a movable valve element carried by the rotating screw for varying the size of the discharge opening to regulate the flow of material from the feeder.

Basically, a screw-type feeder comprises an elongated hollow tube or cylinder having a discharge outlet at one end, and a feed hopper mounted on the other end. An axially aligned shaft is mounted for rotation within the tube. The shaft has one or a plurality of flights and resembles a rotating auger, or screw, which is used to move the material from the hopper through the tube and out its discharge end. Many of the screw-type feeders presently used, employ a valve hingedly mounted on the tube for controlling the rate of discharge of the material through the discharge outlet. Such a conventionally designed screw-type feeder is unsuitable for moving flowable materials, e.g. bentonite, as finely divided material tends to flush through the tube and out the discharge outlet. Also, the discharge valve must be extremely sensitive to pressure as the screw or auger within the tube, will continue to rotate or move through the flowable material as it piles up against the discharge valve, rather than push the excess material from the tube.

This invention is directed to providing a screw-type feeder designed to overcome the flushing tendency of the flowable material, while further providing a feeder in which the rate of discharge of the flowable material can be controlled. In accordance herewith, a disc valve for covering the discharge end of the tube is secured to the shaft on which is mounted one, or a plurality of flights. Means are provided for axially moving the shaft whereby the flights and disc valve on the shaft are also axially moved while rotating. By axially moving the flights as they rotate, greater amounts of flowable material can be pushed from the discharge end. Conversely, by axially moving the flights away from the discharge end, greater amounts of flowable material can be held back and kept from flowing and flushing from the discharge end. The shaft may also be hollow and provided with openings or perforations to permit fluids forced into the hollow shaft, to escape and blend with the flowable material to further fluidize the material within the tube. Further, the perforations can be angularly disposed such that the jets of air emitting therefrom, help in moving the material through the feeder and out its discharge end.

The following description of the invention will be better understood by having reference to the annexed drawing which is a diagrammatic illustration of a screw-type feeder utilizing an embodiment of this invention, this type feeder being used in conjunction with an endless conveyor belt and weighing system for feeding material at a constant rate to machines such as blenders, or pelletizing pans.

Referring more particularly to the drawing, there is shown a conveying system, generally indicated at 10, for feeding flowable material at a constant rate to a hopper 11 of, for example, a blender or pelletizing pan (not shown).

An endless conveyor belt 12 moving around spaced head and tail pulleys 13 and 14, respectively, is provided to carry the flowable material to the hopper 11.

A weight-sensing mechanism or device, generally indicated at 15, is provided intermediate the head pulley 13 and the tail pulley 14, for continuously weighing flowable material charged on the conveyor belt 12.

A screw-type feeder, generally indicated at 16, is used for charging flowable material on the conveyor belt 12 at a controllable rate. The auger or screw-type feeder 16 essentially comprises an elongated hollow tube or cylinder 17. One end 18 of the tube 17, is sealed by a disc 19 having a centrally disposed opening 20, in which is mounted a bearing 21.

A feed hopper 22 is mounted on the tube 17 adjacent its sealed end 18, the flowable material being charged through the hopper 22 into the tube 17.

The opposing tube end 23 is open and communicates with an enlarged cylindrical or tubular portion 24. An annular flange 25 forms an abutment between the open tube end 23 and the enlarged tubular portion 24.

The end 26 of the enlarged tubular portion 24 farthest from the open tube end 23, is also sealed by a disc 27 having a centrally disposed opening 28 which is axially aligned with the opening 20 in the sealed tube end 18. A bearing 29 is similarly mounted in the opening 28.

A shaft 30 extends through the bearings 20 and 29, and is axially aligned with the tube 17 and enlarged portion 24, and is mounted for rotation therein. Any suitable mechanism, generally indicated at 31, may be used to rotate the shaft 30. The mechanism 31 includes, a pulley 32 mounted on the shaft end 33, and rotated by motor 34, through pulley 35 and connecting belt 36.

The shaft 30 is also mounted for axial movement within the tube 17 and enlarged portion 24. Any suitable mechanism, generally indicated at 40, may be provided to axially move the shaft 30, e.g. an axially aligned pneumatic cylinder 43 secured to the shaft end 42.

The shaft 30 is provided with at least one spiralling blade or flight, e.g. flight 48, which rotates and axially moves with the shaft 30. The shaft and attached flight form a screw or auger indicated at 39. The rotating auger 39 moves the flowable material through the tube 17.

The disc or movable valve element 44 is mounted on the shaft 30 within the enlarged portion 24 and can be moved against the annular abutment 25 to seal off the open tube end 23. The enlarged portion has a discharge outlet 45 adjacent the open tube end 23. The disc valve 44 traverses the discharge outlet 45 to restrict its opening. The disc valve 44 is axially movable with the shaft 30 to control the rate of feed of flowable material from the open tube end 23, through the discharge outlet 45, and onto the endless conveyor belt 12. A flexible sock 46 is provided at the discharge outlet 45 for transversely spreading the flowable material on the conveyor belt 12.

A reverse flight 47 is provided on the shaft 30 adjacent the disc valve 44 for keeping any flowable material getting past the disc valve 44, away from the bearing 29. The flight 48 keeps the flowable material away from the bearing 21.

The shaft 30 is, preferably, hollow and is provided with a plurality of perforations or openings 50 spaced along the shaft 30 in the tube 17. Fluid, e.g. air, is pumped into the hollow shaft 30 and forced from the perforations 50 to blend with the flowable material within the tube 17 to further fluidize the material. The perforations 50 are spaced such that a portion of the air, under pressure, also passes through the material in the hopper 22.

An escape opening 51 is provided in the enlarged portion 24 and is, preferably, spaced from the open tube end 23, a distance greater than the disc valve 44. The opening 51 is provided to permit excessive fluid, under pressure, to escape from the screw feeder apparatus 16. The opening 51 is, preferably, covered with a flexible fluid pervious sock 52. The screw feeder 16, when not in use, may be cleaned by passing jets of air through the perforations 50 to clean out the inside of the tube 17. In some cases, steam and air may be alternately passed through the perforations 50 to clean and dry the inside of the tube 17. Any suitable solvents, cleaning agents, or sterilizing agents can also be used to clean the tube 17.

The perforations 50 are, preferably, angularly disposed in the shaft 30 such that the jets of air help move the flowable material through the tube 17 as well as fluidizing it.

*Automatic operation of the screw-type feeder*

To better explain the working of the feed system 10, we will assume that flowable material is being dumped from the conveyor belt 12 into the hopper 11 at a fixed rate, the rate of material feed being controlled by the weight sensing mechanism 15. Any variations in the rate of feed will register with the weight sensing mechanism 15.

Should, for example, the conveyor belt 12 receive a greater amount of material than is necessary, the weight sensing mechanism 15 would activate another sensing mechanism, e.g. switch 54, for controlling the operation of the pneumatic cylinder 43 to axially move the disc valve 44 towards the tube end 23 to restrict the discharge outlet 45 in order to reduce the flow of material from the screw feeder 16.

Conversely, should there be a decrease in the amount of flowable material charged on the conveyor belt 12, the weight sensing mechanism 15 would similarly activate a sensing mechanism, e.g. switch 55, for controlling the operation of the pneumatic cylinder 43 to move the disc valve 44 away from the open tube end 23, to enlarge the discharge outlet 45 in order to increase the flow of material from the screw feeder 16.

A pressure sensing mechanism 41 is interposed in the shaft end 42 between the pneumatic cylinder 43. The sensor 41 is responsive to lateral pressure on the disc valve 44, and is also utilized to activate switches 54 and 55 controlling the operation of the pneumatic cylinder 43. The pressure sensor 41 will detect and respond to flushing of the material before the weight sensing mechanism 15. The independent action of the pressure sensor 41 provides a smoother, more even discharge of material from the discharge outlet 45.

The pressure sensing mechanism 41 is designed to cooperate with the weight sensing mechanism 15. Both the weight sensing mechanism 15 and pressure sensing mechanism 41, co-operate with a third sensing mechanism 56 for controlling the operation of the motor 34 to increase or decrease the rate at which the shaft 30 is rotated. When, for example, material flushes from the discharge outlet 45, the hydraulic cylinder 43 has been acitvated by the weight sensing mechanism 15, the sensor 41 responding to pressure on the disc valve 44, will activate the sensing mechanism 56 controlling the motor 34 to reduce the rotational speed of the shaft 30. Conversely, the speed of the motor 34 is increased when the system calls for more material after the auger 39 is axially moved to enlarge the discharge outlet 45. Thus, even greater amounts of material are pushed through the discharge outlet 45.

The three mechanisms or sensors act in combination with each other to increase or decrease the rate of discharge of flowable material from the discharge outlet 45. Further, greater or lesser amounts of fluid can be forced from the perforations 50, to increase or decrease the fluidization of the flowable material within the tube 17, in order to increase or decrease the rate of discharge of the flowable material from the discharge outlet 45.

The three sensing mechanisms working in combination with each other, provide a means for instantly controlling reactions to the need for more or less material on the conveyor belt 12. The combination of axially moving the auger 39 while increasing or decreasing its rotational movement quickly compensates for changes in the rate of material fed from the discharge outlet 45 onto the conveyor 12 caused, for example, by flushing of the flowable material.

Thus, there has been provided a new and novel screw-type feeder for flowable materials, a feeder in which the fluctuating rate of material discharge has been greatly stabilized, and the flushing tendencies of the flowable material has been substantially reduced or eliminated.

Other modes of applying the principle of this invention may be employed instead of those specifically set forth above, changes being made as regards the details herein disclosed, provided the elements set forth in any of the following claims, or the equivalent of such, be employed.

It is, therefore, particularly pointed out and distinctly claimed as the invention:

1. A system for conveying predetermined amounts of flowable material for admixture with other material, comprising in combination:
   (a) means for moving a predetermined amount of flowable material to a point for admixture with other material, said means including, an endless conveyor belt;
   (b) a weight-sensing mechanism coacting with the conveyor belt, for controlling the amount of flowable material charged on the conveyor belt for movement to the point of admixture;
   (c) a screw-type feeder for charging flowable material on the conveyor belt, said feeder comprising:
      (1) an elongated hollow tube having an opening in one end;
      (2) a shaft mounted within the tube for rotation about, and axial movement along the longitudinal tube axis;
      (3) at least one flight spirally mounted on the shaft, the shaft and flight forming an auger for moving flowable material charged to the tube toward the tube opening, the auger being axially movable while rotating to rapidly increase or decrease the amount of material moved towards the tube opening;
      (4) means for rotating the shaft;
      (5) means for axially moving the shaft and flights carrier thereby;
      (6) a movable valve element for covering the tube opening, the valve mounted on the shaft for axial movement towards and away from the tube opening in order to control the rate of discharge of flowable material therefrom.

2. The system of claim 1, which includes:
   (d) means coacting with the tube opening for charging a layer of flowable material on the conveyor belt; and
   (e) means responsive to the weight-sensing mechanism for controlling the axial movement and rotation of the shaft in order to control the amount of flowable material being discharged from the tube opening.

3. The system of claim 2, wherein the means for axially moving the shaft includes pneumatic means.

4. The system of claim 3, wherein the shaft is hollow and has at least one opening, and means are provided for creating fluid pressure within the shaft, said fluid escaping through the opening for admixture with the flowable material to fluidize it.

5. The system of claim 4, wherein the opening in the shaft is angularly disposed to the shaft axis such that fluid forced from the opening, aids in moving the flowable material towards the tube opening.

6. The system of claim 5, which includes, means coacting with the screw-feeder for letting a portion of the fluid in the tube escape therefrom.

7. The system of claim 4, wherein the means responsive to the weight sensing mechanism for controlling the axial movement and rotation of the shaft includes, separate means responsive to pressure on the valve for controlling the axial movement of the valve towards and away from the tube opening.

8. The system of claim 7, wherein the means responsive to the weight sensing mechanism for controlling the axial movement and rotation of the shaft also includes, separate other means responsive to the weight sensing mechanism and the pressure responsive means for controlling the rotation of the auger within the tube.

9. The system of claim 8, wherein the weight sensing mechanism, the valve pressure responsive means, and the auger rotating responsive means, are responsive to each other.

10. A feeder for moving flowable material and for stabilizing the rate of flow of the material from a discharge opening in the feeder, comprising in combination:
   (a) a rotatable screw mounted within the feeder for moving flowable material towards the discharge opening in the feeder;
   (b) means responsive to material discharged from the opening, for moving the screw axially with respect to said opening to regulate the movement of material towards said opening; and
   (c) a movable valve element carried by the screw for varying the size of the discharge opening.

11. A feeder for flowable material, comprising in combination:
   (a) an elongated hollow tube having a discharge opening;
   (b) a rotatable screw mounted within the tube for moving material towards the discharge opening;
   (c) means for rotating the screw;
   (d) means for charging flowable material to the interior of the tube at a point spaced from the discharge opening in the tube;
   (e) means responsive to flowable material discharged from said opening for moving the rotating screw axially with respect to said opening to regulate the movement of material towards said opening; and
   (f) a movable valve element carried by the screw for varying the size of the discharge opening.

12. The screw-type feeder of claim 11, wherein the screw includes:
   (1) a hollow shaft whose axis coincides with the tube axis, the shaft having at least one opening for permitting fluid under pressure within the shaft to escape and mix with the flowable material in the tube to fluidize it;
   (2) at least one flight spirally mounted on the shaft for moving the flowable material towards the tube opening as the shaft is rotated; and
   (3) means coacting with the shaft for creating fluid pressure within it.

13. The screw-type feeder of claim 12 wherein the opening in the shaft is angularly disposed to the shaft axis such that fluid forced from the opening, aids in moving the flowable material towards the tube opening.

References Cited

UNITED STATES PATENTS

| 2,689,674 | 9/1954 | Goldberg | 222—413 X |
| 2,895,647 | 7/1959 | Wald et al. | 222—504 X |

FOREIGN PATENTS

| 261,428 | 5/1913 | Germany. |
| 727,530 | 5/1913 | Great Britain. |

ROBERT B. REEVES, *Primary Examiner.*

HADD S. LANE, *Examiner.*